Dec. 19, 1950   H. I. STANBACK ET AL   2,534,385
ELECTRICAL TIMING CONTROL
Filed March 2, 1949
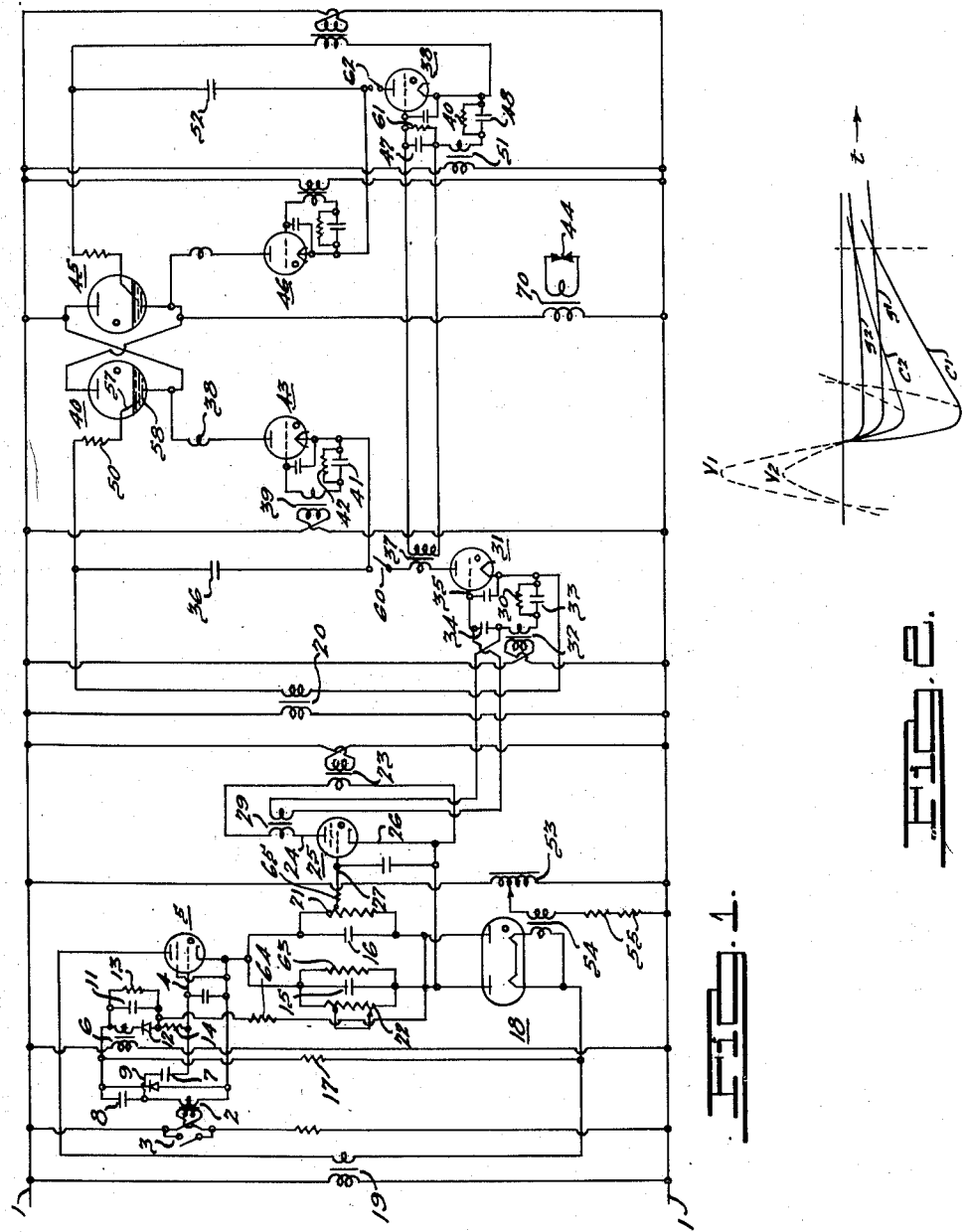
INVENTORS.
Harris I. Stanback,
Ernest G. Anger.
BY
Myron J. Seibold
ATTORNEY.

Patented Dec. 19, 1950

2,534,385

UNITED STATES PATENT OFFICE 2,534,385

ELECTRICAL TIMING CONTROL

Harris I. Stanback, Milwaukee, and Ernest G. Anger, Wauwatosa, Wis., assignors to Square D Company, Detroit, Mich., a corporation of Michigan Application March 2, 1949, Serial No. 79,213

20 Claims. (Cl. 315—355)

This invention relates generally to an electrical timing system for accurately determining a time interval independent of voltage and of change in voltage.

One object of the invention is to provide an electrical timing system controlled by capacitor discharge time and which is independent of the value of the charging supply voltage.

Another object of the invention is the provision of an electrical timing system determined by the differential in rates of decay of a pair of capacitors charged to the same voltage at the same time.

Another object of the invention is an electrical timing system in accordance with the preceding object in which the discharge rate of at least one of the capacitors is variable to vary the timing period.

Another object of the invention is the provision of an electrical timing system in accordance with the immediately preceding object in which the discharge rates of the capacitors are controlled by parallel resistors and in which the variation in timing period by variation in a parallel resistor is a linear relation.

Another object of the invention is a control system for an electrical timing system providing for but a single energization of the timing system for a single operation of an initiating circuit.

Other objects and features of the invention will be readily apparent to those skilled in the art from the specification and appended drawing illustrating certain preferred embodiments in which:

Figure 1 is a diagrammatical representation of a system according to the present invention showing the elements arranged to achieve the objects stated above.

Figure 2 is a representation of the wave forms of the voltage at the cathode and control grid of valve 25.

The invention as illustrated in the single figure of the drawing employs a source of alternating voltage connected to conductors 1 serving to supply power to control and load circuits. Transformer 2 has its primary energized by the source and has an initiating switch 3 controlling a circuit bypassing the transformer 2 primary. The secondary voltage of transformer 2, modified as hereinafter explained, is applied to the grid 4 of electric valve 5. The secondary of transformer 2 charges capacitor 7 by grid rectification of tube 5. This action produces a hold-off bias at grid 4 of tube 5 equal to the output of transformer 2 displaced from the cathode potential of tube 5 by the amount of the D. C. voltage across capacitor 7. The secondary of transformer 2 also charges capacitor 8 through rectifier 9 to produce thereon a D. C. voltage. This voltage opposes a sawtooth voltage across capacitor 11 produced by the output of transformer 6 through rectifier 12 and by a rapid discharge of capacitor 11 through resistor 13 during periods of non-conduction of rectifier 12. The resultant of the opposing voltages of capacitor 6 and capacitor 11 is applied to the grid 4 of tube 5 through a resistor 14 which also serves as a bleeder for capacitor 7.

There is provided a transformer 19 having its primary connected to the supply across the lines 1 and its secondary connected to the anode and cathode of valve 5 through the rectifier tube 18 and the parallel circuit formed by the timing capacitors 15 and 16. Bypassing the capacitor 15 is a fixed resistor 63 and an adjustable resistor 22. Bypassing the capacitor 16 is a resistor 21 of substantially the same resistance as resistor 63 and having an intermediate tap-off point initially adjustable and normally set for the operation of the system.

A transformer 23 has its primary connected to the supply across lines 1 and its secondary output fed to the anode 24 and cathode 26 of the electric valve 25 through the primary of transformer 29. The control grid 27 of valve 25 is connected to the tap-off point of resistor 21 and the cathode 26 is connected between the capacitor 15 and the rectifier tube 18. The secondary of the transformer 29 is connected across the capacitor 34 connected in the circuit of the grid 35 of electric valve 31 which controls the charging of the firing capacitor 36.

A transformer 32 has its primary energized from the supply across lines 1 and its secondary in the circuit of grid 35 in series with the capacitor 34 and a capacitor 33 bypassed by resistor 30. The anode and cathode of the valve 31 are connected across the secondary output of a transformer 20 in series with a firing capacitor 36. The primary of transformer 20 is energized from the supply across lines 1. Also in series with the anode circuit of the valve 31 are the contacts 60 of a thermal flow switch for the electric discharge tubes 40 and 45, and the primary of a transformer 37. Across the firing capacitor 36, which discharges therethrough, are connected the igniter 57 and mercury pool cathode 58 of electric discharge tube 40 through an electric valve 43. Valve 43 has its grid connected to a hold-off bias circuit comprising the secondary of transformer 39 and capacitor 41 bypassed by resistor 42, the primary of transformer 39 being connected to the supply across lines 1.

Connected back to back with the electric discharge tube 40 is a second tube 45, these discharge tubes serving to pass both half cycles of supply current through the load represented by the welding transformer 70 supplying a welding load at 44. Electric discharge tube 45 is fired by components similar to those set forth with respect to tube 40, these constituting the firing capacitor 52, the discharge valve 46 and charging valve 38.

To secure proper firing of the charging valve 38, the secondary output of transformer 37 is fed across a capacity 47 in the grid circuit of valve 38, in series with the elements supplying the hold-off bias and constituted by the secondary of transformer 51 and the capacitor 48 by-passed by resistor 49. The capacitor 47 is by-passed by the discharge resistor 61. In series with the firing capacitor 52 and the valve 38 are the contacts 62 of the thermal flow switch.

The heaters for the thermal flow switches, whose contacts are shown at 60 and 62, are shown at 55 connected in series with each other and through the primary of transformer 54 to a tap-off point of an auto transformer 53 connected across lines 1. The secondary output of transformer 54 is fed through the cathode heaters or filaments of the rectifier tube 18.

In the drawing, the surge by-pass capacitors for the electric valves have been shown but they have not been described; the grid resistors and cathode heaters which would be used have been neither shown nor described as these are conventional elements not essential to the invention, although they would customarily be used in the working circuit.

The operation of the system is as follows:

When initiating switch 3 is closed, the output voltage of transformer 2 disappears and capacitor 7 discharges rapidly. The voltage at control grid 4 of electric valve 5 quickly changes, therefore, from the near sine wave curve of capacitor 7, consisting of the D. C. voltage due to grid rectification plus the A. C. output of transformer 2, to the sawtooth voltage of capacitor 11 plus the steady D. C. voltage of capacitor 8. Valve 5 fires at the next sawtooth peak grid voltage after closure of the initiating switch 3. Valve 5 ceases to conduct as soon as timing capacitors 15 and 16 are charged, capacitor 8 being rapidly discharged through resistor 17. This leaves at the grid 4 of valve 5 only the capacitor 11 sawtooth voltage which is always sufficiently negative to prevent conduction of valve 5, which will, therefore, conduct for only a portion of a half cycle for each closure of the initiating switch 3.

While valve 5 conducts, capacitors 15 and 16 are charged through rectifier tube 18, said capacitors being charged at the same time from the same voltage source, both charging circuits having the same impedances. Therefore, capacitors 15 and 16 are charged to the same voltage and then effectively disconnected from the supply transformer 19 as valve 5 ceases to conduct. Capacitor 16 discharges very slowly through the voltage dividing resistor 21; capacitor 15 discharges more quickly through the fixed resistor 63 and the weld time adjustment resistor 22.

Transformer 23 is so disposed as to make the anode 24 of valve 25 negative with respect to cathode 26 during the period of conduction of valve 5 and rectifier tube 18. As soon as anode 24 becomes positive with respect to cathode 26, valve 25 conducts, because its cathode is at the full negative potential of capacitor 15 while its grid 27 is at approximately one-third of the negative potential of capacitor 16, being electrically connected to approximately one-third point of capacitor-bridging resistor 21. Control grid 27 is positive, therefore, with respect to cathode 26 and will remain so until capacitors 15 and 16 discharge to the cross-over point, where the potential of capacitor 15 is equal to that at the tap on the capacitor-bridging resistor 21 and subsequent positive potentials of the anode 24 with respect to cathode 26 will not fire the valve 25. Time measuring valve 25 will conduct, therefore, on the next half cycle after valve 5 and tube 18 conduct and will continue to conduct during each half cycle during which anode 24 is sufficiently positive with respect to cathode 26 until the above mentioned cross-over point is reached. Conduction of valve 25 energizes coupling transformer 29 which delivers to the grid circuit of valve 31 a measured number of pulses equal in number to the number of full cycles of weld time desired.

Grid 35 of charging valve 31 receives A. C. hold-off voltage from transformer 32 output plus a D. C. component across capacitor 33 which is charged by valve 31 grid rectification. Each output pulse from coupling transformer 29 charges energy into capacitor 34. This energy is discharged into the circuit of grid 35 at the beginning of the following half cycle, providing a voltage signal which overcomes the hold-off bias on grid 35 and causes valve 31 to conduct.

Conduction of valve 31 charges firing capacitor 36 through current transformer 37. Each time capacitor 36 is charged, valve 31 conduction current energizes transformer 37 and the output from the secondary of transformer 37 delivers a pulse to the valve 38 grid circuit.

The circuit consisting of grid bias transformer 39, capacitor 41 and resistor 42 provides a hold-off voltage for valve 43. After the firing capacitor 36 is charged, the tube 43 fires as its grid voltage becomes less negative and quickly discharges capacitor 36 through resistor 50, inductor 38, the igniter 57 and mercury cathode pool 58 of discharge tube 40. Resistor 50 and inductor 38 serve to shape the discharge pulse of capacitor 36 for best firing performance, the high current pulse produced by the discharge serving to initiate conduction of tube 40 in conventional manner.

Discharge tubes 40 and 45 accomplish the function of switching the primary current to the welder transformer 70, being connected back to back in series with one power line to the welder transformer and serving in effect as a single pole contactor.

The circuits for valves 38, 46 and tube 45 are substantially the same as the previously described circuits for valves 31, 43 and tube 40 respectively. Valve 38 fires in response to the output pulses of transformer 37 which occur each time valve 31 conducts. Each of these pulses charges energy into capacitor 47, this energy being discharged into the grid circuit of valve 38 at the beginning of the following half cycle, providing a voltage peak which overcomes the hold-off bias due to capacitor 48, resistor 49, and transformer 51. When valve 38 fires, it charges firing capacitor 52, the firing capacitor being discharged by conduction of valve 46, to effect conduction of mercury pool tube 45 in the same manner as previously described for the interaction of capacitor 36, valve 43 and mercury pool tube 40.

As may be seen by reference to Figure 2, the time during which tube 25 will conduct, or in other terms, the time during which welding current may flow, does not vary with fluctuation in the supply voltage. The dotted sine waves V1 and V2 represent supply voltage of high and low values respectively. C1 and G1 represent the potentials of the cathode and grid, respectively, of valve 25 after the timing capacitors 15 and 16 have been charged by a voltage supply wave of a high value, such as that represented by dotted supply voltage wave V1, C2 and G2 correspondingly represent the potentials of the cathode and grid, respectively, of valve 25 after the timing capacitors 15 and 16 have been charged by a voltage supply wave of relatively low value, such as that represented by dotted sine wave V2.

Valve 5 which charges capacitors 15 and 16 is cut off and ceases to conduct when the capacitors have been charged and remains non-conducting until the initiating switch 3 is again operated. Capacitors 15 and 16 are, therefore, effectively disconnected from the supply during the discharging or timing period so that the timing period is substantially independent of variations of voltage therein.

It will be seen, therefore, that under different or varying conditions of supply voltage, the time required for the potentials of the grid and cathode of the timing valve 25 to become equal is substantially the same. Therefore for any setting of the bleeder resistor 22, the timing valve 25 will conduct during substantially the same length of time regardless of variations in the supply voltage.

The fixed resistor 65 in the grid circuit of valve 25 is of high value to insure that any "cross bleeding" between the timing capacitors during the timing period is negligible. The resistor 64 which parallels the capacitor 16 is also of high value and serves to admit a grid hold-off bias to the grid of valve 25 during the period during which the timing capacitors are not charged.

While certain preferred embodiments of the invention have been specifically disclosed, it is understood that the invention it not limited thereto, as many variations will be readily apparent to those skilled in the art and the invention is to be given its broadest possible interpretation within the terms of the following claims.

What is claimed is:

1. In an electrical timing system, a pair of capacitors, means for charging said capacitors to the same voltage, means for adjustably discharging at least one of said capacitors, said last mentioned means being capable of varying the difference in discharge rates of said capacitors, and means connected to said capacitors and responsive to the difference in voltage thereon to determine the timing period.

2. In an electrical timing system, a pair of capacitors, means for charging said capacitors simultaneously to the same voltage from the same source, means for adjustably discharging at least one of said capacitors, said last mentioned means being capable of varying the difference in discharge rates of said capacitors, and means connected to said capacitors and responsive to the difference in voltage thereon to determine the timing period.

3. In an electrical timing system, a pair of capacitors, means for charging said capacitors simultaneously to the same voltage from the same source, means for slowly discharging one of said capacitors, means for discharging the other of said capacitors more rapidly, said last mentioned means being variable for adjustably discharging said other capacitor, and means connected to said capacitors and responsive to the difference in voltage thereon to determine the timing period.

4. In an electrical timing system, a pair of capacitors, means for charging said capacitors simultaneously to the same voltage from the same source, means including a high resistance paralleling one of said capacitors, means including a variable resistor paralleling the other of said capacitors for adjustably discharging said other capacitor, and means connected to said capacitors and responsive to the difference in voltage thereon to determine the timing period.

5. In an electrical timing system, a pair of capacitors, of the same capacity, means for charging said capacitors to the same voltage, means including fixed bleeder resistances paralleling each of said capacitors, means including a variable resistance paralleling one of said capacitors and variable to affect a linear change in timing for a linear change in resistance, and means connected to said capacitors and responsive to the difference in voltage thereon to determine the timing period.

6. In an electrical timing system, a pair of capacitors of the same capacity, means for charging said capacitors simultaneously to the same voltage from the same source, means including a voltage divider paralleling one of said capacitors, means including a variable resistor paralleling the other of said capacitors and capable of varying the difference in discharge rates of said capacitors, and means responsive to the difference between the voltage of a point on said voltage divider and the voltage of said other capacitor to determine the timing period.

7. In an electrical timing system, a pair of capacitors of the same capacity, means for charging said capacitors simultaneously to the same voltage from the same source, means including a resistive voltage divider paralleling one of said capacitors, means including a resistor of substantially the same resistance as said voltage divider paralleling the other of said capacitors, means including a variable resistor also paralleling said other capacitor and variable to effect a linear change in timing for a linear change in resistance, and means responsive to the difference between the voltage of a point on said voltage divider and the voltage of said other capacitor to determine the timing period.

8. In an electrical timing system, a pair of capacitors of the same capacity, means for charging said capacitors simultaneously to the same voltage from the same source, means including a resistance voltage divider paralleling one of said capacitors, means including a resistor of substantially the same resistance as said voltage divider paralleling the other of said capacitor, means including a variable resistor also paralleling said other capacitor and variable to effect a linear change in timing for a linear change in resistance, an electric valve, and means connecting said electric valve to a point on said voltage divider and to said other capacitor so that the conduction of said valve is dependent upon the difference between the voltages of said point and of said other capacitor.

9. In an electrical timing system, a pair of capacitors, means for charging said capacitors to the same voltage, means including a voltage divider paralleling one of said capacitors, means including a variable resistor paralleling the other of said pair of capacitors and capable of varying the difference in discharge rates of said capacitors, an electric valve, and means connecting said electric valve to a point on said voltage divider and to said other capacitor so that the conduction of said valve is dependent upon the difference between the voltages of said point and of said other capacitor.

10. In an electrical timing system, a pair of capacitors, means for charging said capacitors simultaneously to the same voltage from the same source, means including a voltage divider paralleling one of said capacitors, means including a variable resistor paralleling the other of said pair of capacitors and capable of varying the difference in discharge rates of said capacitors, an electric valve, and means connecting said electric valve to a point on said voltage divider and to said other capacitor so that the conduction of said valve is dependent upon the difference between the voltages of said point and of said other capacitor.

11. In an electrical timing system, a pair of capacitors, means for charging said capacitors to the same voltage, means including a resistive voltage divider paralleling one of said capacitors, means including fixed and variable resistors paralleling the other of said capacitors, said fixed resistor being of substantially the same resistance as said voltage divider, said variable resistance effecting a linear change in timing for a linear change in resistance, an electric valve, and means connecting said electric valve to a point on said voltage divider and to said other capacitor so that the conduction of said valve is dependent upon the difference between the voltages of said point and said other capacitor.

12. In an electrical timing system, a pair of capacitors, means for charging said capacitors to the same voltage, means for adjustably discharging at least one of said capacitors, said last mentioned means being capable of varying the difference in discharge rates of said capacitors, an electric valve, and means connecting elements of said electric valve to said capacitors so that the conduction of said valve is determined by the difference in the voltages of said capacitors.

13. In an electrical timing system, a pair of capacitors, means for charging said capacitors simultaneously to the same voltage from the same source, means for adjustably discharging at least one of said capacitors, said last mentioned means being capable of varying the difference in discharge rates of said capacitors, an electric valve, and means connecting elements of said electric valve to said capacitors so that the conduction of said valve is determined by the difference in the voltages of said capacitor.

14. In an electrical timing system, a pair of capacitors, means for charging said capacitors, means for adjustably discharging at least one of said capacitors, said last mentioned means being capable of varying the difference in discharge rates of said capacitors, and means connected to said capacitors and responsive to the difference in voltage thereon to determine the timing period.

15. In an electrical timing system, a pair of capacitors, means for charging said capacitors, means for adjustably discharging at least one of said capacitors, said last mentioned means being capable of varying the difference in discharge rates of said capacitors, an electric valve, and means connecting elements of said electric valve to said capacitors so that the conduction of said valve is determined by the difference in the voltages of said capacitors.

16. In an electrical timing system, a pair of capacitors, means for charging said capacitors, means for adjustably discharging at least one of said capacitors, said last mentioned means being capable of varying the difference in discharge rates of said capacitors, and means connected to said capacitors and responsive to the difference in voltage thereon to determine the timing period, said charging means including initiating means providing for the passage of but a single charging pulse until the initiating means is reactuated.

17. In an electrical timing system, a timing circuit, an electric valve controlling the energization of said timing circuit, a grid bias normally imposed on the control grid of said valve and constituted by the resultant of at least first and second added capacitors and a third opposed capacitor, the first and second added capacitors normally maintaining a negative bias on the control grid at least while the valve anode is positive, means for charging said capacitors, initiating means for the timing circuit including means for interrupting the charging of said first and third capacitors, means for quickly discharging the first capacitor so that the third capacitor overrides the second capacitor to provide for conduction of the valve for a single half cycle, and means discharging the third capacitor when the valve conducts so that the second capacitor alone has control of the valve grid to prevent conduction of the valve thereafter until the initiating means is reactuated.

18. In an electrical timing system, a timing circuit, an electric valve controlling the energization of said timing circuit, a grid bias normally imposed on the control grid of said valve and constituted by the resultant of at least first and second added capacitors and a third opposed capacitor, means connecting said first capacitor such that said capacitor is charged by grid rectification of said valve, means including rectifiers charging said second and third capacitors, the first and second added capacitors normally maintaining a negative bias on the control grid at least while the valve anode is positive, initiating means including means for interrupting the voltage supply to said first and third capacitors, means for quickly discharging the first capacitor so that the third capacitor overrides the second capacitor to provide for conduction of the valve for a single half cycle, and means discharging the third capacitor when the valve conducts so that the second capacitor alone has control of the valve grid to prevent conduction of the valve thereafter until the initiating means is reactuated.

19. In an electrical timing system, a timing circuit, an electric valve controlling the energization of said timing circuit, a grid bias normally imposed on the control grid of said valve and constituted by the resultant of at least first and second added capacitors and a third opposed capacitor, means connecting said first capacitor such that said capacitor is charged by grid rectification of said valve, means including rectifiers charging said second and third capacitors, the first and second added capacitors normally maintaining a negative bias on the control grid at least while the valve anode is positive, initiating means including means for interrupting the voltage supply to said first and third capacitors, means including a circuit of relatively low resistance for discharging said first capacitor so that the third capacitor overrides the second capacitor to provide for conduction of the valve for a single half cycle, means for discharging said third capacitor including a circuit of relatively low resistance connected through the valve circuit so that after the valve conducts the second capacitor alone has control of the valve grid to prevent conduction of the valve thereafter until the initiating means is reactuated.

20. In an electrical timing system, a timing circuit including a pair of capacitors, means including an electric valve controlling the charging of said capacitors, means for slowly discharging one of said capacitors, means for discharging the other of said capacitors more rapidly, said last mentioned means being variable for adjustably discharging said other capacitor, and means connected to said capacitors and responsive to the difference in voltage thereon to determine the timing period, a grid bias normally imposed on the control grid of said valve and constituted by the resultant of at least additional first and second added capacitors and a third opposed capacitor, the first and second added capacitors normally maintaining a negative bias on the control grid at least while the valve anode is positive, initiating means for the timing circuit including means for interrupting the charging of said first and third capacitors, means for quickly discharging the first capacitor so that the third capacitor overrides the second capacitor to provide for conduction of the valve for a single half cycle, and means discharging the third capacitor when the valve conducts so that the second capacitor alone has control of the valve grid to prevent conduction of the valve thereafter until the initiating means is reactuated.

HARRIS I. STANBACK.
ERNEST G. ANGER.

REFERENCES CITED

The following references are of record in the file of this patent:

UNITED STATES PATENTS

| Number | Name | Date |
|---|---|---|
| 2,409,522 | Woll | Oct. 15, 1946 |
| 2,454,167 | Hartwig | Nov. 16, 1948 |